United States Patent [19]

Hansford

[11] 4,060,318

[45] Nov. 29, 1977

[54] PROJECTION APPARATUS

[75] Inventor: Reginald Frederick Hansford, London, England

[73] Assignee: Decca Limited, London, England

[21] Appl. No.: 669,288

[22] Filed: Mar. 22, 1976

[51] Int. Cl.[2] .......... G03B 21/00; G03B 21/26

[52] U.S. Cl. .......... 353/42; 353/84; 353/88; 353/94; 35/10.2

[58] Field of Search .......... 353/94, 42, 11, 84, 353/88, 122, 121, 27 R; 356/247; 350/10; 40/106.52; 35/10.2, 12 N

[56] References Cited

U.S. PATENT DOCUMENTS

| | | | |
|---|---|---|---|
| 2,275,631 | 3/1942 | Johnson | 33/298 |
| 2,412,017 | 12/1946 | Taylor et al. | 350/10 |
| 2,950,382 | 8/1960 | Hatch | 353/84 |
| 3,016,791 | 1/1962 | Inwagen | 353/11 |
| 3,195,402 | 7/1965 | Hamilton | 353/42 |
| 3,545,361 | 12/1970 | Brandt | 353/88 |
| 3,642,360 | 2/1972 | Ataka | 353/25 |
| 3,658,414 | 4/1972 | Fukushima | 353/25 |
| 3,846,008 | 11/1974 | Sobajima et al. | 33/298 |

*Primary Examiner*—Harry N. Haroian

*Attorney, Agent, or Firm*—Edward F. Connors

[57] ABSTRACT

A projector for projecting a movable spot of light onto a screen includes a pair of plates mounted adjacent and parallel to each other, each plate being opaque, apart from a straight slot. The slots cross one another at a crossing point defining an aperture which is transparent to light from a light source. The plates are mounted to be independently movable in such a way that the aperture is selectively displaceable thereby to allow controlled movement of the spot on the screen.

15 Claims, 9 Drawing Figures

PROJECTION APPARATUS

FIELD OF THE INVENTION

This invention relates to apparatus for projecting a movable spot of light onto a screen, and is particularly, but not exclusively, applicable to navigational training apparatus in which one or more moving spots of light are projected onto a screen to simulate a changing pattern of navigation lights.

These lights may, for instance be such as would, in a true situation, be observed from the bridge of a ship proceeding along a buoyed channel.

BACKGROUND OF THE INVENTION

The pattern of lights along a buoyed channel as seen by the navigator of a ship proceeding along the channel is similar to the pattern of street lamps seen by a motorist driving along a lighted street, except that the buoylights are below eye-level rather than above. The distant lights appear to move very slowly, while the apparent motion of near lights increases rapidly as they pass out of the driver's field of view on either his left or his right side. The form of the changing picture that should be presented on a screen, in front of an observer, in order to simulate the changing navigational situation, corresponds to the pattern that he would actually see if he were standing on the ship's bridge (at a particular height above the water) at a particular, but alterable, point in the channel.

It will be apparent that the pattern of lights may comprise not only buoy lights, but also the lights of other vessels, shore lights, lighthouse beacons, etc. The term navigation light used hereinafter is intended to cover all of these forms of lights.

A particular characteristic of buoy light (as opposed to a ship's navigation light) is that it does not show continuously but shows for, say, 1 second in every 10 seconds. Alternatively, it may be showing for most of the time but be extinguished for, say, 1 second in every 10 second. A buoy operating in the former manner is known as a "flashing" buoy, and a buoy operating in the latter manner is known as an "occulting" buoy.

Some buoys show a white light, others show a red, some green, and a lighthouse may show a sequence of flashes using two or more colours. (For simplicity of description "white" is deemed to be a colour). It would be advantageous therefore, that each light spot projected onto the screen be controllable so that it can appear intermittently and in either of two or more colours.

SUMMARY OF THE INVENTION

According to the invention there is provided apparatus for projecting a movable spot of light onto a screen, comprising means defining a displaceable aperture, and a light source for illuminating said aperture, the said means comprising a first movable element defining a slot which is transparent to light from said light source, a second movable element which defines a slot which also is transparent to light from said light source and which crosses the slot of the first element, the crossing point of said slots defining said aperture, and means for independently moving said first and second elements, thereby to displace the aperture.

The first and second elements may comprise a pair of plates, each of which is opaque apart from a fine straight transparent line which constitutes the slot, the said plates being mounted adjacent and parallel to one another with the crossed lines preferably, but not necessarily orthogonal, and each being arranged to be displaced in a direction preferably perpendicular to its own line.

Means may be provided for interrupting the optical path of light from the aperture, thereby enabling the intermittent projection of the spot, and/or for interposing a coloured filter into the optical path, thereby to change the colour of the spot. This means may comprise a movable shutter between the elements and a projection lens driven by a stepper motor to any one of several, for instance three positions. In one of these positions, the light is cut off, in another the light is unchanged and in the third a coloured, for instance red, filter is interposed. Alternatively, a number of shutter/filter blades may be provided, each movable into the optical path to colour or to block the light beam from the aperture.

The invention also relates to a simulating system including a screen, and a plurality of projection apparatuses as hereinbefore defined, arranged to project light spots onto the screen, the first and second elements of the projectors being displaceable to produce a changing pattern of lights on the screen.

The means for moving the first and second elements may comprise a lead screw and motor arrangement, the operation of the motor being controlled from a computer, in accord with information concerning the relative positions of the lights, thereby to simulate a pattern of navigation lights.

The screen may be opaque, in which case the light pattern would be visible only on the same side of the screen as the projection apparatuses, or translucent, in which case the pattern could be viewed from either side.

BRIEF DESCRIPTION OF THE DRAWINGS

Like parts are designated by the same reference numerals in the different figures of the accompanying drawings.

DETAILED DESCRIPTION OF THE PREFERRED EMBODIMENTS

Figure 1:
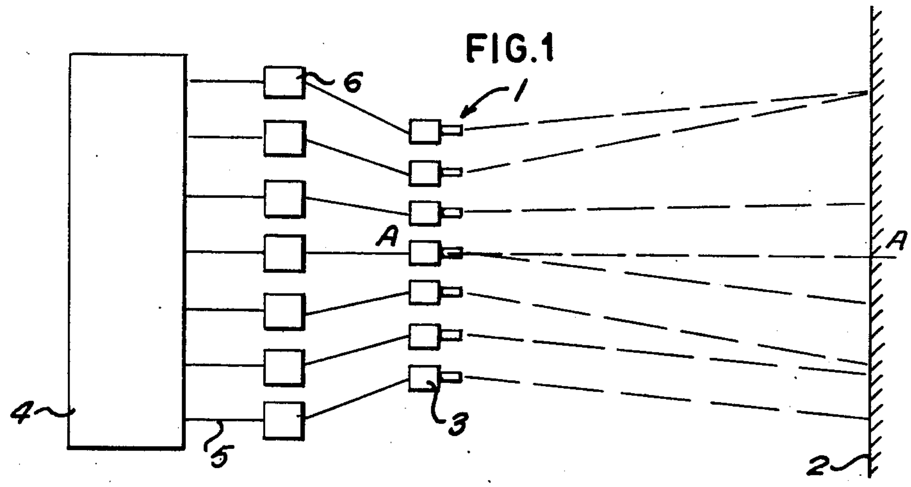
FIG. 1 is a schematic diagram illustrating a navigation light simulating system including a plurality of projection apparatuses in accordance with the invention.

With reference first to FIG. 1, a navigation light simulating system 1 includes a screen 2 and a plurality of light spot projectors 3 arranged to project spots of light, one from each projector onto the screen. The projectors are constructed so as to permit movement of the light spots, as will be described with reference to FIGS. 2 to 7.

The movement of the spots is controlled by a digital computer 4 which has a plurality of output channels 5 each coupled to the corresponding projector through a digital to analogue converter 6. Alternatively, a number of analogue computers could be used.

Figure 2:
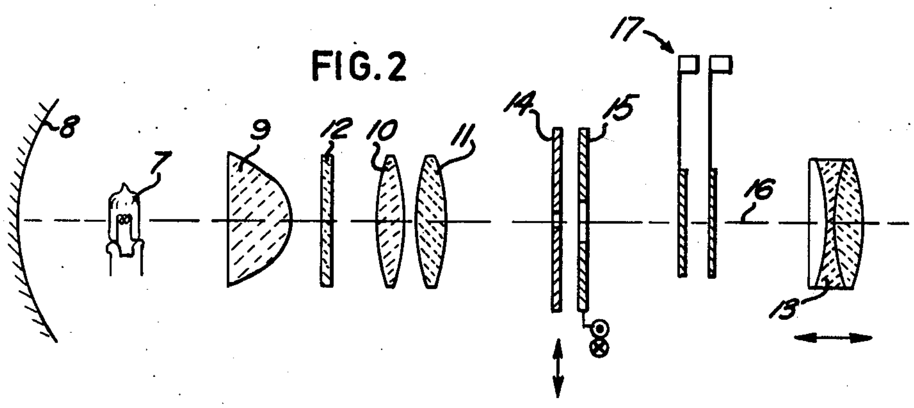
FIG. 2 is another schematic diagram illustrating the optical arrangement of each of the projection apparatuses in the system of FIG. 1.

For the construction of the projectors, reference is now made to FIGS. 2 to 7. The optical arrangement, illustrated schematically in FIG. 2 is similar to that used in a simple slide projector, there being provided an incandescent or gas discharge lamp 7, a concave mirror 8, a triple condenser lens system comprising converging lenses 9, 10 and 11, a heater filter 12 and a projection lens system 13. In place of the usual slide frame, there is provided a spot forming and moving device comprising a pair of closely spaced parallel plates 14 and 15 mounted normally to the optical axis 16 of the projector. Each of these plates is opaque except for a fine transparent line. The line on the plate 14 is horizontal, and the line on the plate 15 is vertical. The plates are movable in orthogonal directions, each being movable in a direction perpendicular to that of its transparent line. That is to say, as seen in FIG. 2, plate 14 is movable vertically, while plate 15 is movable normally to the plane of the paper.

The construction and mounting of the plates 14 and 15 will be described in detail hereinafter with reference to FIGS. 3 to 7.

With reference again to FIG. 2, a shutter and filter assembly 17 is disposed between the plates and the projection lens system 13, for shutting off, or colouring the light leaving the projector. Two alternative forms of this assembly 17 will be described hereinafter with reference to FIGS. 8 and 9.

Figure 3:
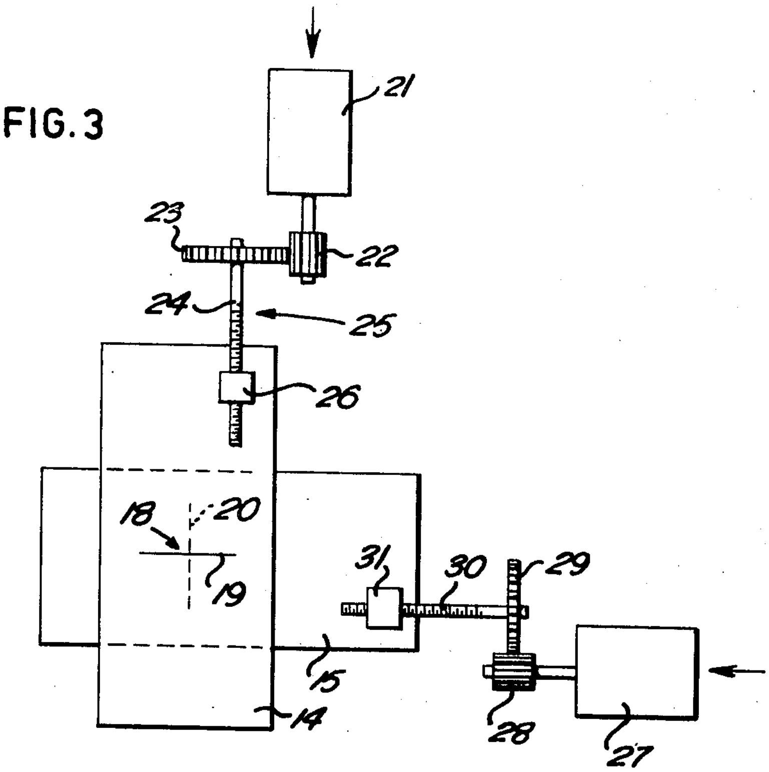
FIG. 3 is a schematic diagram illustrating the arrangement of a pair of movable elements of a projector according to the invention, and one means for driving these elements.
Figure 4:
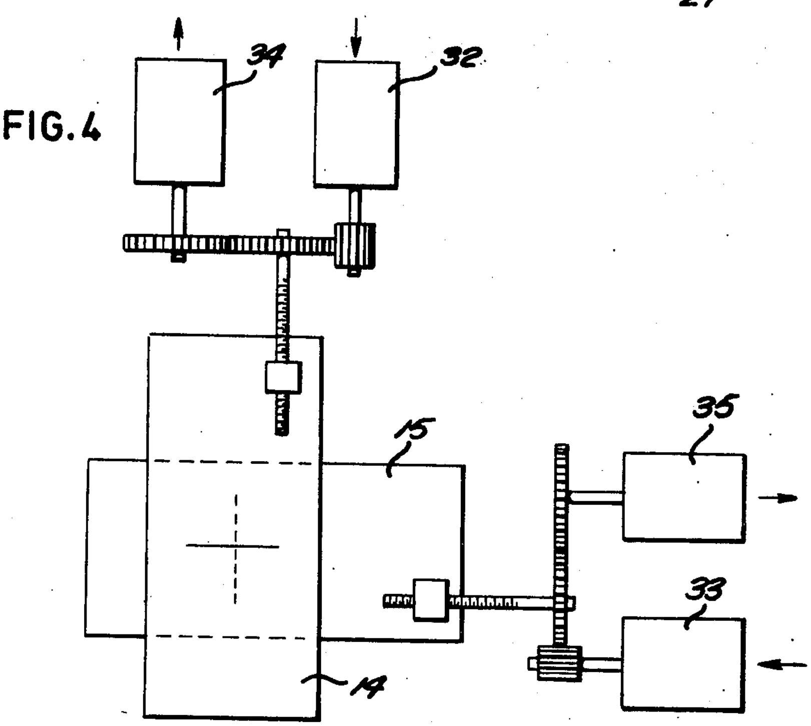
FIG. 4 is a schematic diagram similar to FIG. 3, illustrating another means for driving the movable elements.

With reference to FIG. 3, the point of intersection 18 of the horizontal line 19 on plate 14, and the vertical line 20 in plate 15 defines the position of the corresponding light spot on the screen 2. The spot is therefore movable in any direction on the screen (and at an adjustable speed), by the controlled movement of the two plates 14 and 15. Plate 14 is driven by a stepper motor 21 arranged to rotate, via gear wheels 22 and 23, a threaded shaft 24 of a lead screw assembly 25. The assembly 25 also includes an internally threaded member 26, mounted on the plate 14 and cooperatively engaged with the shaft 24 so that the plate 14 is displaced vertically as the drive shaft of the motor 21 rotates. A similar drive assembly, comprising stepper motor 27, gear wheels 28 and 29 and lead screw assembly consisting of threaded shaft 30 and internally threaded member 31 is provided for displacing the plate 15 horizontally. Each plate is spring loaded to remove backlash in the screw. The stepper motors 21 and 27 are coupled to be actuated in accord with signals received over the corresponding output channel of the computer. An alternative drive assembly for the plates 14 and 15 is illustrated in FIG. 4. Here, lead screw assemblies are driven through gear wheels from servo motors 32 and 33, controlled through closed loop systems including servo potentiometers 34 and 35 and servo amplifiers of high gain to ensure that small signal input changes are followed. These potentiometers's shafts are driven in accordance with the rotation of the drive shafts of the servo motors. Other drive mechanisms may be used, such as a rack and pinion.

Figure 6:
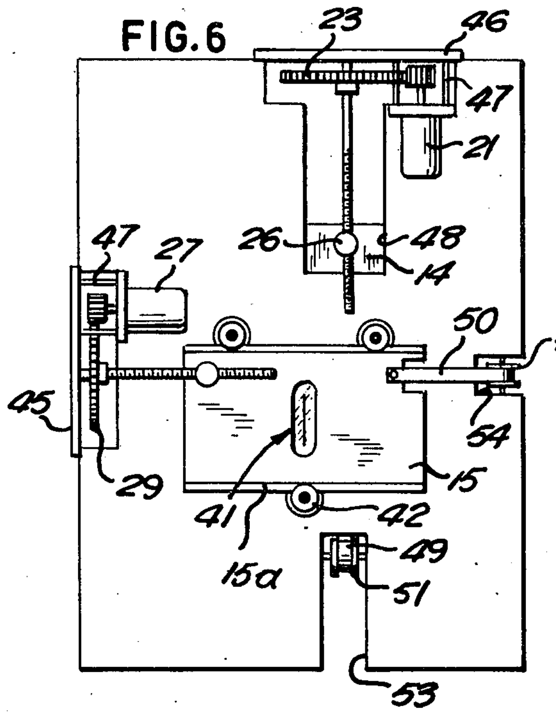
FIG. 6 is an elevational view of the arrangement of FIG. 5, as seen from side 6 and shows a number of further features of the preferred embodiment.
Figure 5:
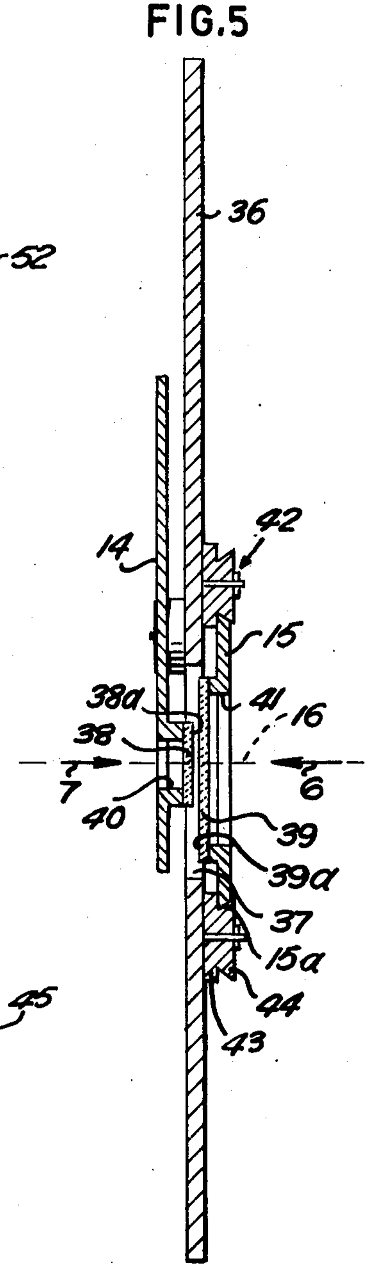
FIG. 5 is a vertical section illustrating the form and manner of mounting of these movable elements on a vertically disposed mounting plate in one preferred embodiment of the invention.
Figure 7:
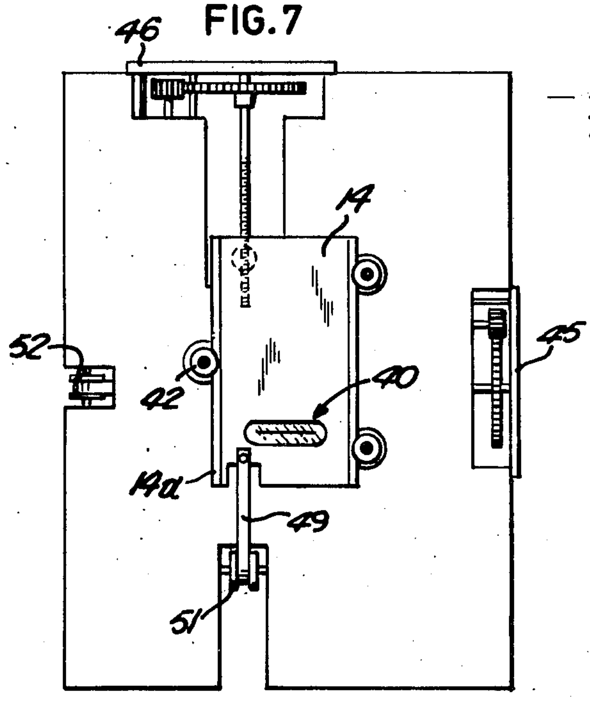
FIG. 7 is an elevational view of the arrangement of FIG. 5, as seen from side 7, and also shows further features of the preferred embodiment.

Reference will now be made to FIGS. 5 to 7 which illustrate various features of a preferred embodiment of the invention. In this embodiment the concave mirror 8, lens 9 and heat filter 12 are provided as an optical unit which is readily obtainable commercially. The lamp 7 and lenses 10 and 11 are suitably mounted in association with this optical unit so that the optical configuration is as illustrated in FIG. 2. A detailed description of the mounting arrangement for these elements is thought unnecessary here.

The plates 14 and 15 are mounted one on either side of a mounting plate 36 having a rectangular aperture 37 and arranged vertically normal to the axis 16 to locate the plates optically following the condenser lenses 10, 11. Transparent lines 19 and 20 are formed on mutually facing surfaces **38*a*, 39*a* of two planar glass slides 38 and 39 respectively, attached to the inner faces of the plates 14 and 15 within the area of the aperture 37. The plates 14 and 15 are formed with respectively horizontal and vertical elongate apertures 40, 41 over which the slides 38 and 39 are attached. These slides project inwardly of the depth of the aperture 37, so that the separation of the surfaces 38*a* and 39*a* is as small as possible, to ensure good focus for the projected spot. The opacity, apart from the transparent lines, of the slides 38 and 39 is provided by a coating on the surfaces 38*a* and 39*a*** which coating may be an emulsion layer as on an exposed photographic plate, or alternatively a sputtered metallic layer. The metallic layer is preferred since, being highly reflective, it prevents over-heating of the slides.

The plates 14 and 15 are rectangular, and their parallel longer edges are bevelled to engage with low friction rollers 42 of, for instance, nylon. Three such rollers are rotatably mounted on each side of the mounting plate 36, two rollers engaging one edge and the third engaging the other edge of the respective plate. The rollers 42 each have a circular flange 43 which serves to space the plate from the surface of the mounting plate 36, and, integrally formed therewith a frustoconical portion 44 which engages the bevelled edge **14*a* or 15*a*** of the plate.

The stepper motors 21 and 27 are both disposed on the side of the mounting plate 36 carrying the plate 15. Edge plates 45 and 46 are fixedly attached respectively to a vertical and the top edge of the mounting plate. The motors 27 and 21 are mounted, by means of spacers 47 on the edge plates 45 and 46 respectively, and the gear wheels 23 and 29 are located in cut out portions along the edges of the mounting plate. The internally threaded member 26 on plate 14 projects through a slot 48 in the mounting plate.

The spring loading of the plates to remove backlash is provided by coil springs 49, 50 wound on spools 51 and 52. These spools are rotatably mounted in further slots 53 and 54 in the mounting plate, and the free ends of the coil springs 49, 50 are fixedly attached to the plates 14, 15 respectively. In a particular embodiment the aperture defined by the intersection 18 was movable within a rectangular area 36 mm in width and 24 mm in height, and the maximum speed of the motors was such that the minimum traverse time of this aperture was about 40 seconds for full horizontal travel, and 15 seconds for full vertical travel.

Figure 8:
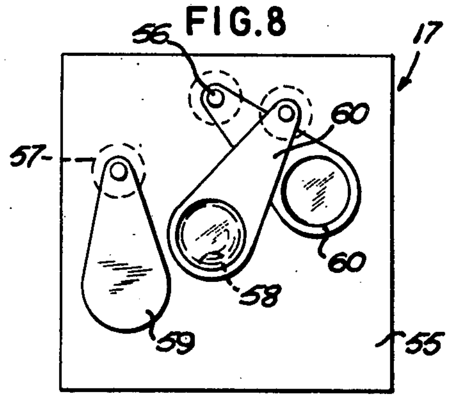
FIG. 8 shows one arrangement of shutter and filter elements which may be used in a projector according to the invention.

Referring now to FIG. 8, a shutter arrangement 17 is illustrated, in which a plurality, in this instance three blades are pivotally mounted on a support plate 55. Each blade is attached to the shaft 56 of a two position rotary actuator 57, which may, for example be a stepper motor or a rotary solenoid mounted on the opposite side of the support plate, which has a central aperture 58. The projection lens system is mounted on the opposite side of the support plate in optical alignment with aperture 58. One of the blades 59 is a shutter, and when positioned over the aperture 58 prevents the projection of a light spot. The other two blades 60 constitute mounting elements for a pair of coloured filters, one green and one red, and are formed with circular apertures in, or over which the filters are fixed. By selectively positioning the blades 60 by operation of the respective two-position rotary actuators, the projected light spot may be coloured green or red. If no blade is positioned over the aperture 58, a white spot is projected. Operation of the motors 57 is again controlled by the computer.

Figure 9:
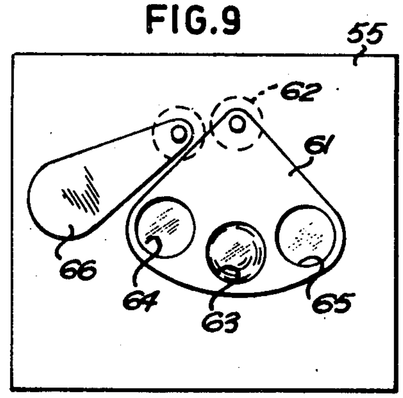
FIG. 9 shows an alternative shutter and filter element arrangement.

FIG. 9 illustrates an alternative arrangement in which a filter plate 61 is pivotally mounted on the support plate 55 and attached to the spindle of a three position rotary actuator 62 so as to be movable to any of three positions. In one of these positions an aperture, 63 in the filter plate 61 is positioned over the aperture 58 in the support plate, to allow a white spot to be projected. In the other positions either a green or a red filter 64 or 65 is positioned over the aperture 58. To block the light, a blade 66, and a two-position rotary actuator are provided as in the arrangement of FIG. 8.

It will be readily understood that with the planar movement (as distinct from an angular movement) of the crossing point of the two lines 19 and 20 there is a linear relation between the movement of this point and the corresponding movement of the light spot on the flat screen. That is to say, if the crossing point is moving at a constant speed in a particular direction, the light spot on the screen moves in the same direction at a constant, but greater, speed. This is particularly advantageous, since in an arrangement such as that illustrated in FIG. 1, where a plurality of projectors are employed, these may be disposed about the centre line A — A of the system, and a single zero correction made to each projector during setting up to bring the zero positions of their individual light spots into exact coincidence on the screen. This zero correction may be provided either by a small lateral movement of the projector lens, by an electrical zero setting in the servo drive amplifier used to drive the corresponding servo motor, or by a zero setting command in the computer. Such corrections may be used together, the lens adjustment giving an approximate correction, and the electrical or computer adjustment giving a fine correction.

The rotary actuators operating the shutter arrangement 17 are controlled by the computer so that the blades/shutter plate may be operated in accordance with a predetermined sequence, to simulate any of a number of different types of navigation light, such as a flashing white light, or a constant red light etc., the sequence of the flashing being determined by the length of, and separation between, voltage pulses applied to the rotary actuators which may be stepper motors.

It will be appreciated that when the apparatus is in use as a marine navigational simulator, lights at or about the horizontal mid-line of the screen will represent navigational lights on the horizontal, i.e. distant, while lights nearer to the bottom of the screen will represent closer navigational lights. It is desirable, therefore that the light spot increases in apparent brightness when it moves downward across the screen, while remaining substantially of the same brightness when it moves only horizontally. A lenticular projection screen, when arranged with its lines running vertically provides a reflectance polar diagram which is such that the required variation of apparent brightness can be obtained without the use of complex apparatus. To achieve this it is arranged that the projector-screen-eye path is on the polar diagram maximum when the light spot is at the bottom of the screen, and is off the maximum when the light spot is at the middle of the screen. Alternatively, the change in brightness may be brought about by varying the lens aperture or projector lamp brightness by command from the computer.

I claim:

1. Navigational light simulating apparatus for use in a navigational training system comprising in combination a screen and a projection means for projecting a plurality of movable spots of light onto the screen to simulate a changeable pattern of navigational lights, said projection means comprising a plurality of light spot projectors displaced one from another laterally about a center line of the system extending between the screen and the projection means, wherein each projector comprises an optical system having an optical axis and including means defining an aperture which is controllably displaceable in a predetermined aperture plane, a light source for illuminating the aperture and means for focusing an image of the illuminated aperture onto the screen to form a respective spot of light thereon, said means defining the displaceable aperture comprising a pair of parallel plates mounted adjacent one another and normal to said optical axis, each being opaque to the light from said light source apart from a fine straight transparent line, said lines extending in orthogonal directions and crossing one another at a crossing point defining said aperture, mounting means by which each of said plates is mounted for linear movement in its own plane in a direction transverse the direction in which the respective transparent line extends, and means for independently moving said plates in said respective directions of linear movement, thereby to displace the aperture.

2. Apparatus according to claim 1 wherein each plate is formed with an elongate aperture and includes a planar slide disposed over said elongate aperture on one side of the plate, said fine transparent line being formed in said slide which is otherwise opaque.

3. Apparatus according to claim 2 wherein said plates are mounted with their respective slides parallel to and adjacent each other.

4. Apparatus according to claim 3 wherein, in respect of each plate, the fine transparent line is formed in an otherwise opaque coating on a surface of the respective slide.

5. Apparatus according to claim 4 wherein said opaque coatings are provided on mutually facing surfaces of said slides.

6. Apparatus according to claim 1 wherein the means for moving the plates comprise, in respect of each plate, a drive assembly comprising a motor having a rotatable drive shaft coupled to move the respective plate through a lead screw drive assembly.

7. Apparatus according to claim 6 wherein said motor is a stepper motor.

8. Apparatus according to claim 6 wherein said motor is a servo motor and said drive assembly also includes a servo potentiometer having a rotatable shaft coupled for rotation in accord with the rotation of the drive shaft of the motor.

9. Apparatus according to claim 6 wherein each said element is spring biased to overcome backlash in the lead screw assembly.

10. Apparatus according to claim 1 including a displaceable shutter for interrupting the optical path of light from the aperture.

11. Apparatus according to claim 10 wherein the shutter comprises a blade mounted on the shaft of a rotary actuator which is selectively operable to pivot the blade into and away from the said optical path.

12. Apparatus according to claim 1 including a coloured filter displaceably mounted to be interposed in the optical path of light from the aperture.

13. Apparatus according to claim 12 wherein the filter is carried by a mounting element mounted on the shaft of a rotary actuator which is selectively operable to move the filter into and away from the said optical path.

14. Apparatus according to claim 13, and including a plurality of said filters, each of different colour, and each carried by a respective mounting element mounted on the shaft of a respective stepper motor.

15. Apparatus according to claim 13 and including a plurality of said filters, each of different colour and each carried on said mounting element.

* * * * *